Figure 2:
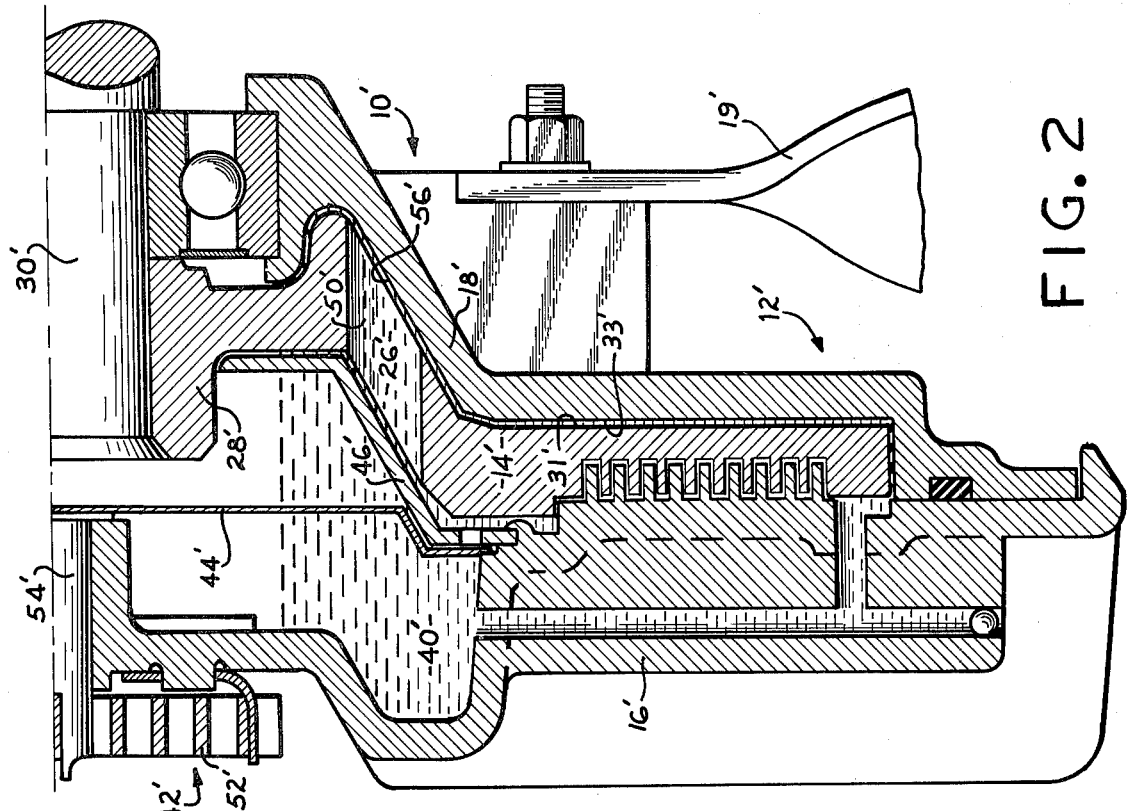

United States Patent [19]

Tinholt

[11] 4,076,110

[45] Feb. 28, 1978

[54] QUICK DISENGAGEMENT VISCOUS DRIVE COUPLING

[75] Inventor: Thomas H. Tinholt, Marshall, Mich.

[73] Assignee: Eaton Corporation, Cleveland, Ohio

[21] Appl. No.: 722,907

[22] Filed: Sep. 13, 1976

[51] Int. Cl.² ............................................. F16D 35/00
[52] U.S. Cl. .................................. 192/58 B; 192/82 T
[58] Field of Search ............................. 192/58 B, 82 T

[56] References Cited

U.S. PATENT DOCUMENTS

| | | | |
|---|---|---|---|
| 3,363,734 | 1/1968 | Sabat | 192/58 B |
| 3,741,359 | 6/1973 | Leichliter | 192/58 B |
| 3,809,197 | 5/1974 | Clancey | 192/58 B |
| 3,907,084 | 9/1975 | Hall | 192/58 B |

Primary Examiner—Allan D. Herrmann
Attorney, Agent, or Firm—J. R. Teagno

[57] ABSTRACT

A temperature responsive viscous drive coupling having a working chamber which substantially conforms to the rotor. The coupling has a housing which defines a central cavity divided by a plate into a reservoir and a working chamber. A rotor is rotatably supported relative to the housing and located within the working chamber. The housing and the plate closely conform to the configuration of the rotor to reduce to a minimum the space within the working chamber surrounding the rotor. Dimensions are maintained between the plate and the rotor and the housing and the rotor which are generally no greater than fifty to seventy thousands of an inch. These dimensions are within acceptable manufacturing tolerances to insure that rubbing does not occur between the rotor and the housing or the plate. In such an arrangement, the volume of the fluid in the working chamber when the coupling is in the static condition will be about one-third or less than the total volume of fluid within the coupling. The disclosure results in an increase in torque capacity and a substantial decrease in the time required to pump fluid out of the working chamber into the reservoir during start up.

8 Claims, 2 Drawing Figures

U.S. Patent  Feb. 28, 1978  4,076,110

QUICK DISENGAGEMENT VISCOUS DRIVE COUPLING

The present invention relates to viscous shear fluid drive couplings wherein a fluid shear medium transmits torque between relatively rotatable input and output coupling members. Such fluid couplings are usable for driving various kinds of load devices and find particular utility for driving an internal combustion engine accessory, such as, a cooling fan.

Typically, a viscous drive coupling for a fan of an internal combustion engine includes a rotor and a housing which have interdigitated lands and grooves spaced closely adjacent each other with a viscous fluid located therebetween. The viscous fluid functions to transmit torque from the rotor to the housing. The advantages of using such a coupling for driving a fan are well known.

Certain known viscous drive couplings include a mechanism for controlling the amount of viscous fluid between the lands and grooves to control the amount of torque transmitted from the rotor to the housing. If there is no fluid between the rotor and housing, no torque is transmitted therebetween. On the other hand, if the rotor is surrounded with fluid, the maximum possible torque is transmitted from the rotor to the housing. At intermediate levels of fluid, intermediate degrees of torque transmission are provided. It can, accordingly, be seen that torque transmission from the rotor to the housing is directly related to the amount of viscous fluid located therebetween. Illustrations and descriptions of the preceding may be found in U.S. Pat. Nos. 3,055,473; 3,263,783; and 3,809,197.

When such viscous drive couplings are left in a stationary position, as when a vehicle is parked overnight, the fluid runs to its lower most level in the coupling. During relatively cold mornings, for example, 30° F., the viscosity of the fluid increases. When the vehicle is started, a substantial volume of the fluid is located between the rotor and housing, i.e., within the working chamber. Until this fluid is pumped out, torque is transmitted from the rotor to the housing and, accordingly, the fan is driven. This pump out time can take anywhere from two to five minutes during start-up. With even lower temperatures, the pump out time will be increased.

One arrangement for solving this problem has been proposed in U.S. Pat. No. 3,363,734. Although this arrangement is found to be very satisfactory in operation, applicant has determined that another way to solve this problem exists without making use of an additional temperature responsive element. In doing this, applicant has also determined that the torque transmitting power of the coupling in normal operation can also be increased.

The above improvements have been accomplished by reducing the volume of viscous fluid in the working chamber and, accordingly, increasing the volume of the viscous fluid in the reservoir.

The total volume of viscous fluid in the coupling must completely fill the drive portion between the rotor and the housing within the working chamber during rotation of the coupling. Further, the size of the reservoir must be adequate to maintain the static fluid level of the drive coupling at a position below the bearing used to rotatably support the rotor.

For the purpose of this disclosure, a static condition of a viscous drive coupling is a condition wherein the coupling is not rotating but is rather located in a stationary position. It is assumed that the coupling's axis of rotation is at right angle to a straight line passing through the center of the earth. It is also assumed that all of the fluid in the coupling has flowed under gravity to its lowest most position. This position is identical to that illustrated in FIGS. 1 and 2 of the drawings.

Applicant's invention, accordingly, is the reduction of the volume of fluid in the working chamber to a minimum value. For practical design considerations, it may be said that when the coupling is in a static condition, the volume of fluid in the working chamber will be about one-third or less of the total volume of the fluid within the coupling. This volume reduction results in a decrease in pump out time and an increase in torque transmission. A possible overall reduction in the total volume of viscous fluid required for the coupling may also occur.

Figure 1:
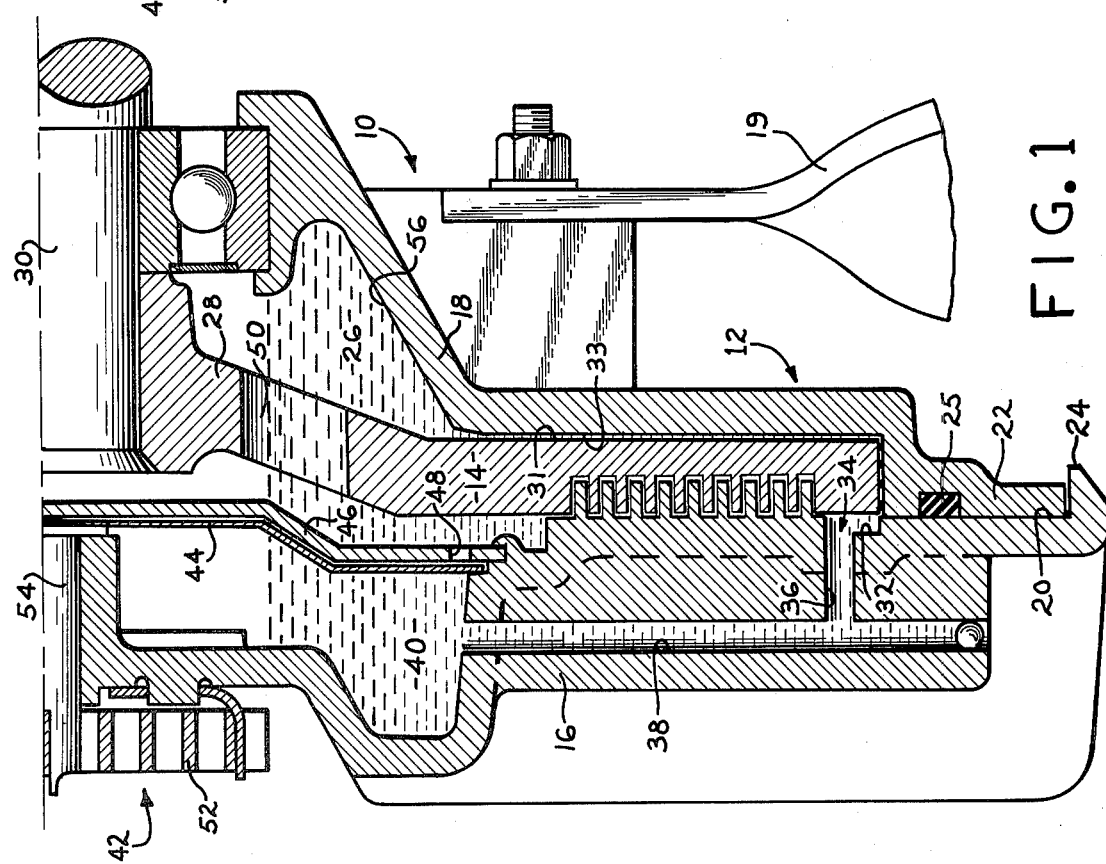

FIG. 1 is a sectional view of one-half of a prior art viscous drive coupling illustrating a coupling which is identical to that illustrated in U.S. Pat. No. 3,809,197.

FIG. 2 is a sectional view similar to FIG. 1 illustrating a viscous drive coupling embodying features of the invention.

In order to better understand the present invention, one should first understand the prior art. Accordingly, FIG. 1 illustrates a prior art heavy duty viscous drive coupling. The coupling 10 includes a housing 12 and a rotor 14. Housing 12 comprises a forward member 16 and a rear member 18. An annular fan 19 is secured to rear member 18 by means of fasteners. The fan provides a flow of cooling air through a radiator of an internal combustion engine with which the fan is associated. Forward member 16 has a pilot portion with a surface 20 which extends perpendicular therearound and which guides the outer portion 22 of rear member 18 into an assembled position. Annular lip 24 of forward member 16 is rolled over to secure members 16 and 18 together. An annular "O" ring seal 25 is provided between members to prevent leakage of viscous shear fluid therebetween.

Members 16 and 18 define a working chamber 26 in which rotor 14 rotates. Rotor 14 is dish shaped and has a hub portion 28 secured to a shaft 30. Shaft 30 is used to drive rotor 14 and is driven by a pulley, not shown, which is driven by a belt from the crankshaft of the engine.

Torque transmitting surfaces are provided on the rotor and the housing in the form of a plurality of lands and grooves. Further, the radially outer surfaces 31 and 33 on the rotor and housing are no more than forty thousands (0.040) of an inch from each other to aid such torque transmission, and preferably twelve to twenty five thousands (0.012 to 0.025) of an inch. The lands and grooves on forward member 16 cooperate with the lands and grooves on rotor 14 and are interdigitated as illustrated. The lands and grooves on the radially outer surfaces of the housing and rotor are very closely spaced, i.e., no more than thirty thousands (0.030) of an inch and preferably ten to twenty five thousands (0.010 to 0.025) of an inch, to provide a substantial area for the transmission of torque between the rotor and housing. A viscous shear fluid is provided within working chamber 26 around rotor 14 to transmit torque from rotor 14 to housing 12 in a known manner.

The available torque needed to drive a fan is a function of the amount of viscous fluid in the working chamber and the area of the surfaces on the rotor and housing which are closely spaced relative to one another and covered by the fluid. Accordingly, a mechanism for pumping viscous fluid from the shear space and a temperature sensing valve mechanism for controlling the flow of fluid back into the shear space is provided to control the volume of fluid and, accordingly, the available torque.

The viscous shear fluid is pumped from the shear space by the action of a pair of pumping surfaces formed on face 32 of forward member 16. The pumping surfaces are located in the path of fluid as it is dragged around member 16 by the rotation of rotor 14. The pumping surfaces extend generally perpendicular to face 32. The impingement of fluid against the pumping surfaces creates a pressure adjacent respective discharge openings 34, only one illustrated, in output member 12. The discharge openings communicate with respective axially extending passages, one of which is shown and designated 36. Each axially extending passage communicates with a radially extending passage 38, only one illustrated, in member 16. Fluid flows from working chamber 26 into a reservoir 40 only via the radially extending passages.

Reservoir 40 comprises an annular chamber which encircles the axis of rotation of rotor 14 and housing 12. The reservoir is defined in part by forward member 16 and provides for the storage of viscous shear fluid. The volume of the reservoir is such that substantially all of the viscous shear fluid in coupling 10 may be stored therein.

The viscous shear fluid flows into working chamber 26 under the control of a temperature responsive valve mechanism 42. The valve mechanism includes a valve member 44 which cooperates with an annular plate 46 which defines one side of reservoir 40. Plate 46 is suitably secured to forward member 16 around the periphery of the plate and has a pair of 180 degree spaced inlet openings 48 therein, only one illustrated, communicating with reservoir 40 and working chamber 26. Valve member 44 extends radially relative to plate 46 and is positionable in an overlying position with respect to inlet openings 48. When valve member 44 closes openings 48, fluid may not flow from reservoir 40 into working chamber 50. In the event, however, valve member 44 is moved so that openings 48 are uncovered, fluid may flow from reservoir 40 through openings 48 and into working chamber 26. From there, the fluid is thrown outwardly by centrifugal force.

Valve member 44 is moved relative to plate 46 by a temperature sensing bi-metallic spiral spring element 52 mounted on forward member 16. The spring element is connected with one end of a shaft 54. Shaft 54 is rotatable in plate 46 and is connected at its other end to valve member 44. The spring element is of a type which when it senses a change in the ambient temperature surrounding it, it affects a rotation of shaft 54. Shaft 54, in turn, affects a movement of valve member 44 relative to plate 46. This arrangement is similar in operation to the valve disclosed in U.S. Pat. No. 3,263,783 and reference may be made thereto for further details of construction and operation. Also, if more specific details are required on the coupling of FIG. 1, such details may be found in U.S. Pat. No. 3,809,197.

It may be seen from FIG. 1 that two separate chambers exist in coupling 10 for retaining fluid. These chambers are designated reservoir 40 having a volume of A units, and working chamber 26 having a volume of B units. The viscous fluid is illustrated in FIG. 1 as it would appear when coupling 10 is in a static condition. In this position, approximately 58 percent of the viscous fluid is located in working chamber 26 and 42 percent of the viscous fluid is located in reservoir 40. Although one specific embodiment of a prior art viscous drive coupling is illustrated, the embodiment is well representative of all other known viscous drive couplings that are manufactured and sold.

When the engine is started and coupling 10 begins to rotate, fluid in the reservoir and the working chamber is forced outwardly circumferentially around coupling 10. Further, the fluid in working chamber 26 is pumped into reservoir 40. Due to the large amount of fluid in the working chamber, this pump out time is extended beyond the desired amount and, accordingly, while fluid exists in working chamber 26, the fan will be rotated at an angular velocity approximating that of rotor 14. When the fluid is removed from working chamber 26, the angular velocity of the fan will be greatly reduced until fluid is permitted to flow through inlet openings 48 from reservoir 40 into working chamber 26.

In the FIG. 1 drive, approximately 45 ml of fluid is provided with approximately 19 ml in the reservoir and 26 ml in the working chamber when the coupling is in a static condition. Of the 26 ml in the working chamber approximately 6 ml will remain therein during all phases of operation since the fluid will be located radially outwardly beyond the radially outermost portion of openings 34.

Referring now to FIG. 2, the present invention is illustrated in reference to a viscous drive coupling 10' similar to that illustrated in FIG. 1. Like numerals followed by a prime (') are used to illustrate the components in FIG. 2 which are similar to the components in FIG. 1.

The primary difference between coupling 10' of FIG. 2 and that of coupling 10 in FIG. 1 is the reduction in the volume B' of working chamber 26' and the increase in volume A' of reservoir 40'. In FIG. 2, a much greater percentage of the fluid exists in reservoir 40' than in reservoir 40 of FIG. 1. The sizes of the volumes A' and B' in FIG. 2 are configured to allow for the same fluid level in viscous drive 10' as that existing in viscous drive 10 when the two are in a static condition. The given relationship between the volume of A' and the volume B' is preferably in the range of 32 ml for A' and 13 ml for B'. Of this 13 ml, 6 ml will remain in the working chamber at all times. This compares to 19 ml for A in FIG. 1 and 26 ml for B in FIG. 1. The reduction of the volume B' to 13 ml greatly reduces the amount of time it takes to pump fluid out of working chamber 26' into reservoir 40'. Further, with this arrangement, it has been determined that a lower viscosity fluid may be used in drive 10' of FIG. 2 than that in drive 10 of FIG. 1 to achieve acceptable torque transmission between the input member and the output member. The reduction of fluid viscosity also improves pump out time since the fluid more easily flows out of the discharge openings 34' into reservoir 40'.

It has further been determined that by reducing the volume of the working chamber, the peak output torque for coupling 10' of FIG. 2 was increased to about 15 ft. lbs. This compares with a peak output torque of about 13.5 ft. lbs. for coupling 10 of FIG. 1 when the same fluid is used in each drive. These changes in torque primarily came about by decreasing the volume of the working chamber. The above figures for torque assume an input angular velocity of 4000 revolutions per minute to the rotor. This results in an output angular velocity of 3650 revolutions per minute for coupling 10′ and 3450 revolutions per minute for coupling 10.

The preceding improvements have been achieved by offsetting the radially extending portion 50′ of rotor 14 between hub portion 28′ and the lands and the grooves. This offset is configured to conform with the inner surface 56′ of rear member 18′ with the two radially inner conforming surfaces being located no more than fifty thousands of an inch from each other, and preferably twenty to forty thousands (0.020 to 0.040) of an inch. Further, plate 46′ was configured to conform with radially extending portion 50′ of rotor 14′ and to encircle hub portion 28′ with the two radially inner conforming surfaces being located no more than seventy thousands (0.070) of an inch from each other and preferably twenty to forty thousands (0.020 to 0.040) of an inch. The outer peripheral portion of plate 46′ still engages forward member 16′. The configuration of forward member 16′, rear member 18′, rotor 14′, and plate 46′ are chosen to match as closely as possible while still providing high volume manufacturing tolerance which would not result in rubbing between any two adjacent pieces. To accomplish these desired results, it may be said that the volume of the working chamber in a static condition should be in the area of about one-third or less of the total volume of fluid in drive 10′. This, accordingly, would leave two-thirds of the volume of the fluid within reservoir 40′ in the static condition.

I claim:

1. A viscous drive coupling comprising:
   (a) a housing defining an annular cavity bounded by a pair of generally radially extending axially disposed annular surfaces;
   (b) a shaft rotatably supported by said housing and partially located within said cavity;
   (c) an annular rotor secured to said shaft within said cavity, said rotor having a pair of generally radially extending axially disposed annular surfaces, one of said annular surfaces on said rotor having a radially inner portion disposed no more than fifty thousands (0.050) of an inch from a portion of one of said annular surfaces of said housing and a radially outer portion disposed no more than forty thousands (0.040) of an inch from another portion of said one annular surface of said housing, and the other annular surface of said rotor having a radially outer portion disposed no more than thirty thousands (0.030) of an inch from a portion of the other annular surface of said housing;
   (d) a plate located within said cavity and connected to said housing to divide said cavity into a working chamber containing said rotor and a reservoir, said plate having a generally radially extending annular surface disposed no more than seventy thousands (0.070) of an inch from a radially inner portion of said other annular surface of said rotor;
   (e) fluid disposed in said cavity and positionable between said annular surfaces to transmit energy through said fluid from either said housing or said rotor respectively to said rotor or said housing;
   (f) valve means effecting selective fluid flow communication between said reservoir and said working chamber;
   (g) means for controlling said valve means;
   (h) means defining a discharge opening for fluid flow communication between said working chamber and said reservoir; and
   (i) pump means carried by either said housing or said rotor to pump fluid from said working chamber during rotation of said housing and said rotor through said discharge opening to said reservoir.

2. A viscous drive coupling according to claim 1 wherein:
   (j) said inner portion of said one annular surface of said rotor is disposed between twenty and forty thousands of an inch from said annular surface of said housing;
   (k) said radially outer portion of said one annular surface of said rotor is disposed between twelve thousands and twenty five thousands of an inch from said annular surface of said housing; and
   (l) said radially outer portion of said other annular surface of said rotor is disposed between ten thousands and twenty five thousands of an inch from said other annular surface of said housing.

3. A viscous drive coupling according to claim 1 wherein the volume of the fluid within said working chamber when said viscous drive coupling is in a static condition is one-third or less of the volume of fluid within the reservoir.

4. A viscous drive coupling according to claim 1 wherein at least one of the radially outer portions of said annular surfaces on said rotor and the adjacent radially outer portion of said annular surface on said housing include a plurality of annular lands and grooves in an interdigitated relationship.

5. A viscous drive coupling according to claim 4 wherein the total volume of fluid within said cavity is sufficient to completely cover all of the lands and grooves during rotation of said coupling.

6. A viscous drive coupling comprising:
   (a) a housing defining an annular cavity bounded in part by a generally radially extending annular surface containing an annular shear surface;
   (b) a shaft rotatably supported by said housing and partially located within said cavity;
   (c) an annular rotor secured to said shaft within said cavity, said rotor having a pair of generally radially extending axially disposed annular surfaces, one of said axially disposed annular surfaces containing an an annular shear surface that is disposed adjacent said annular shear surface of said housing;
   (d) fluid disposed within said cavity and positionable between said shear surfaces to transmit energy through said fluid from said housing or rotor respectively to said rotor or housing;
   (e) a plate located within said cavity and contacting said housing to divide said cavity into a working chamber containing said rotor and no more than one-third of the volume of said fluid when said coupling is in a static condition, said plate having a generally radially extending annular surface disposed adjacent at least a portion of an annular surface of said rotor;
   (f) a reservoir defined within said cavity by said plate and said housing, said reservoir being substantially located radially inwardly from said annular shear surfaces and containing the remainder of said fluid when said coupling is in a static condition;
   (g) Valve means effecting selective fluid flow from said reservoir to said working chamber;
   (h) means for controlling said valve means;
   (i) means defining a discharge opening for fluid flow communication between said working chamber and said reservoir; and (j) pump means to pump fluid from said working chamber during rotation of said housing and rotor through said discharge opening to said reservoir.

7. A viscous drive coupling according to claim 6 wherein said adjacent annular shear surfaces on said housing and rotor comprises a plurality of annular lands and grooves in an interdigitated relationship.

8. A viscous drive coupling according to claim 7 wherein the total volume of fluid within said cavity is sufficient to completely cover all of the lands and grooves during rotation of said coupling.

* * * * *